United States Patent [19]

Kawazu et al.

[11] Patent Number: 6,120,850
[45] Date of Patent: Sep. 19, 2000

[54] COLORED FILM FORMING COMPOSITION AND METHOD OF MANUFACTURING COLORED FILM COATED GLASS PRODUCT

[75] Inventors: Mitsuhiro Kawazu; Katuhiko Kinugawa; Taro Miyauchi; Koichi Maeda, all of Osaka-fu, Japan

[73] Assignee: Nippon Sheet Glass Co., Ltd., Osaka-fu, Japan

[21] Appl. No.: 09/180,793

[22] PCT Filed: Mar. 13, 1998

[86] PCT No.: PCT/JP98/01052

§ 371 Date: Mar. 11, 1999

§ 102(e) Date: Mar. 11, 1999

[87] PCT Pub. No.: WO98/41481

PCT Pub. Date: Sep. 24, 1998

[30] Foreign Application Priority Data

Mar. 14, 1997 [JP] Japan .................................. H9-060894

[51] Int. Cl.[7] ....................................................... B05D 3/02
[52] U.S. Cl. .......................... 427/384; 427/387; 427/389.7
[58] Field of Search ..................................... 427/387, 384, 427/389.7

[56] References Cited

U.S. PATENT DOCUMENTS 5,589,273 12/1996 Dorbath et al. .......................... 428/433

FOREIGN PATENT DOCUMENTS 8-283040 10/1996 Japan .
10-111174 4/1998 Japan .

OTHER PUBLICATIONS

Innocenzi et al, Journal of Sol–Gel Science and Technology, vol. 1, pp. 305–318, 1994.

Primary Examiner—Erma Cameron
Attorney, Agent, or Firm—David G. Conlin; Lisa Swiszcz Hazzard; Dike, Bronstein, Roberts & Cushman, LLP

[57] ABSTRACT

By using a colored film forming composition, which contains at least an organic silicon compound and chloroauric acid and to which is added at least one type of compound exhibiting the maximum exothermic peak in the range of 170° C. to 250° C., in differential thermal analysis, the precipitation of gold micro-particles on the film surface can be prevented and gold micro-particle dispersion glass can be manufactured in a stable manner.

The colored film forming composition of the present invention can thus be used for coating the surface of glass products, especially, windows, mirrors, etc. of automobiles and other vehicles and buildings.

7 Claims, No Drawings

COLORED FILM FORMING COMPOSITION AND METHOD OF MANUFACTURING COLORED FILM COATED GLASS PRODUCT

This is the national stage of International Application No. PCT/JP98/01052, filed Mar. 13, 1998.

FIELD OF THE ART

The present invention concerns a colored film forming composition, in particular a composition of excellent preservation stability for forming colored films to be used in windows, mirrors, etc. of automobiles and other vehicles and buildings, and a method for manufacturing colored film coated glass products using the colored film forming composition.

BACKGROUND ART

Among methods of obtaining colored glass is the ion exchange method in which a glass surface is coated with an inorganic salt of silver or an inorganic salt of copper and then baked to cause the silver or copper micro-particles in the inorganic salt to permeate into the glass substrate and thus cause colloidal coloration of glass to occur. There is also a method in which a salt of gold, silver, or other metal is dissolved in a silicon alkoxide solution, the resulting solution is coated onto the substrate, and heat treatment is performed to form a silicon oxide coating containing metal micro-particles.

In particular, glass which has been colored by the surface plasmon of gold or silver micro-particles excels in heat and light resistance and has been used priorly as colored glass or filter glass. In recent years, the sol-gel method has come to be used widely. For example, a method of providing a colored film coated glass plate is described in J. Sol-Gel. Sci. Techn. 1, 305–312 (1994) in which a glass substrate is coated with a solution containing chloroauric acid and alkoxide of silane and then subject to heat treatment to form a silica film as a matrix containing gold micro-particles in the dispersed condition.

However, in obtaining a gold micro-particle dispersion colored film coated glass by the sol-gel method, there was a problem in that in the abovementioned process of heat treatment of the film, the growth of gold micro-particles occurs at the same time as the contraction of the matrix and the gold micro-particles thus tended to become expelled outside of the film. Since the expelled gold micro-particles come off readily when the film is wiped with the hands, the proportion of chloroauric acid in the coating solution that remains as gold micro-particles in the colored film is decreased and the coloring effect is weakened. Also in the actual mass production process, the amount of micro-particles that are expelled outside of the film varies and this has been a factor of variation of the quality of colored glass and has lead to a lowering of yield and increases in cost.

The object of the present invention is to present a colored film forming composition, with which the precipitation of gold micro-particles on the film surface is prevented and gold micro-particle dispersion glass can be manufactured in a stable manner by the sol-gel method, and a method of manufacturing a colored film coated glass product using the colored film forming composition.

DISCLOSURE OF THE INVENTION

The present invention presents in a colored film forming composition, containing at least an organic silicon compound and chloroauric acid, a colored film forming composition characterized by adding at least one type of compound that exhibits the maximum exothermic peak in the range of 170° C. to 250° C., in differential thermal analysis.

In the present invention, an organic compound or an inorganic compound may be used as at least one type of compound, with which the maximum exothermic peak is exhibited (the temperature at which the maximum peak among several exothermic peaks occurs) in the range of 170° C. to 250° C., in differential thermal analysis and which is to be added to the colored film forming composition containing at least an organic silicon compound and chloroauric acid. As said organic compound, an organic compound having one ether bond and a carbon-carbon double bond inside the molecule can be used favorably. Acrylate, methacrylate, and vinyl compounds can be given as favorable examples of such an added organic substance, and trimethylolpropane triacrylate (maximum exothermic peak temperature=234° C.), having six ethylene oxide units in the molecule, can be given as a specific, preferable example. The amount of said organic substance to be added is preferably 0.5 to 5 wt. %, or more preferably, 0.7 to 4 wt. % of the total amount of the colored film forming composition (total amount of the coating liquid, including the solvent). It is presumed that the variation of the amount added within these ranges lead to changes in the particle size or particle shape of the gold micro-particles, and the transmission color tone of the colored film can be adjusted thereby. When the amount added is too small, the film surface precipitation prevention effect is weakened. It is also not preferable for the amount added to be too large since bright coloration will not result, and the film will take on a color close to metallic gold, and the haze will be large. This is considered to be due to the size of the gold micro-particles becoming too large.

Examples of inorganic compounds that exhibit the maximum exothermic peak in the range of 170° C. to 250° C., and in differential thermal analysis include cerium nitrate (maximum exothermic peak temperature=200° C.), cobalt chloride (maximum exothermic temperature=234° C.), iron nitrate (maximum exothermic temperature=225° C.), and iron chloride (maximum exothermic temperature=249° C.). The amount of the abovementioned inorganic compound to be added is preferably 0.3 to 20 wt. %, or more preferably, 0.5 to 15 wt. % of the total amount of solids of the colored film forming composition (total amount of solids after the colored film forming composition has been dried and baked into a solid film). Since these inorganic compounds remain inside the colored film as oxides, when the amount used is high, cerium oxide will absorb ultraviolet rays while cobalt oxide and iron oxide will absorb visible light to change the color tone of the colored film.

In the heat treatment process after the coating of the above-described composition onto the substrate surface, the organic silicon compound undergoes hydrolysis and polycondensation to form a silica matrix and the chloroauric acid undergoes thermal decomposition to form gold micro-particles. By the addition of a compound having the maximum exothermic peak in the range of 170° C. to 250°, the gold micro-particles are prevented from not contributing to coloration by being expelled outside of the film and precipitating on the surface of the film, and the coloration effect is thus increased. Furthermore, subtle variations of the color tone are enabled by adjusting the amount of said added compound.

The reason as to why the abovementioned added compounds prevent the precipitation of gold micro-particles on the film surface is presumed to be as follows. That is, judging from the TG-DTA characteristics curve of the abovementioned compounds, the added compounds exhibit the maximum exothermic peak and decreases suddenly in weight at a temperature in the range of 170 to 250° C. In the process of heat treatment of the coating film, the network structure of the silica matrix becomes smaller at a temperature near 200° C. due to rapid contraction of the film. During this process, the gold micro-particles that are in the network structure and are in the growing process tend to be expelled outside of the film as a result of being expelled outside of said network. However, the added compound restricts the rapid contraction of the film at this point and thereby secures a region for growth of the gold micro-particles and prevents the gold micro-particles from becoming expelled outside of the film. Also, after the gold micro-particles have grown completely, the contraction of the matrix will have also progressed and thus the gold micro-particles will not be expelled outside of the film. Furthermore, due to generation of heat by the added compound, the growth of gold micro-particles and the contraction of the matrix surrounding the gold micro-particles occur at the same time with the growth and fixing of the gold micro-particles occurring in a short time. By adjusting the amount of additive, that is, by adjusting the spacial region in which the gold micro-particles can grow and the amount of heat generated, subtle control of the color tone is enabled. If a compound that exhibits the maximum exothermic peak at a temperature less than 170° C. or more than 250° C. is added, since the temperature at which the compound generates heat will not coincide with the temperature at which the gold micro-particles are formed and precipitated, the compound will not be able to prevent the expulsion of gold micro-particles outside of the film.

The respective components of the above-described colored film forming composition of the present invention shall now be described.

The organic silicon compound causes the film to have a silicon oxide component. This silicon oxide component is necessary as a matrix material of low refractive index that fixes the gold micro-particles and causes the coloration of the gold micro-particles to be reddish. The silicon oxide component is also necessary for keeping the visible ray reflectance of the film at a low value. If the content of the silicon oxide component is too low, the reflectance becomes too high. On the other hand, if the content is too high, the coloration becomes weak and the value of the colored glass as a product is lowered. The content of organic silicon compound, as weight percentage of $SiO_2$ in the total amount of solids of the colored film forming composition, is thus preferably 50 to 94 wt. %, or more preferably 70 to 92 wt. %

The organic silicon compound, which is to be the raw material of the silicon oxide that forms the colored film in the present invention, can be any silicon compound which enables a more transparent and stronger film to be formed by the sol-gel method and is excellent in stability, that is, any silicon compound that can undergo hydrolysis and polycondensation. Specific examples shall be given below.

An alkoxide of silicon is preferable as the organic silicon compound as a raw material for silicon oxide. Tetraalkoxysilanes, such as tetramethoxysilane, tetraethoxysilane, tetrapropoxysilane, tetrabutoxysilane, etc. can be given as examples. Condensates (of $n \geq 2$, where n indicates the degree of condensation) of the above compounds or mixtures of such condensates may also be used. Condensates that can be used include, for example, hexaethoxydisiloxane (n=2), octaethoxytrisiloxane (n=3), decaethoxytetrasiloxane (n=4), ethoxypolysiloxane ($n \geq 5$), etc. Mixtures, such as "Ethyl Silicate 40" (product trade name for the Colcoat Co.), which is comprised of a mixture of monomer (n=1) and condensate ($n \geq 2$) [the composition in weight percentage, indicated in J. Cihlar's literature on Colloids and Surfaces A: Physicochem. Eng. Aspects 70 (1993) pp. 253 to 268, is monomer (n=1): 12.8 wt. %, dimer (n=2): 10.2 wt. %, trimer (n=3): 12.0 wt. %, tetramer (n=4): 7.0 wt. %, polymer ($n \geq 5$): 56.2 wt. %, ethanol: 1.8 wt. %], can be used favorably.

Also, compounds such as alkyltrialkoxysilanes, in which the alkoxy group of an abovementioned compound is replaced by an alkyl group or other hydrocarbon group, may also be used. Compounds in which the alkoxy group has been replaced by a straight chain or branched alkyl group, such as the methyl group, ethyl group, propyl group, butyl group, 2-ethylbutyl group, octyl group, etc., by a cycloalkyl group, such as the cyclopentyl group, cyclohexyl group, etc., by an alkenyl group, such as the vinyl group, allyl group, γ-methacryloxypropyl group, γ-acryloxypropyl group, etc., by an aryl group, such as the phenyl group, toluyl group, xylyl group, etc., by an aralkyl group, such as the benzyl group, phenethyl group, etc., by the γ-mercaptopropyl group, γ-chloropropyl group, γ-aminopropyl group, etc. can be given as examples.

The chloroauric acid in the above-described colored film forming composition of the present invention is for dispersed precipitation of the gold micro-particles within the film, and the gold micro-particles in the film are necessary for coloring the film in a bright color. If the amount of gold micro-particles is too high, not only does the durability of the film become low, but since the gold micro-particles are formed after the film is coated due to reasons of manufacture, the micro-particles become large in shape and prevent the desired coloration from being obtained. Thus the content of chloroauric acid, as the weight percentage of Au in the total amount of solids of the colored film forming composition, is preferably 5 to 20 wt. %, or more preferably 7 to 18 wt. %.

Though the colored film forming composition of the present invention thus contains, in addition to the compound exhibiting the maximum exothermic peak at 170° C. to 250° C. in differential thermal analysis, the organic silicon compound of an amount corresponding to 50 to 94 wt. % $SiO_2$ in the total amount of solids and chloroauric acid of an amount corresponding to 5 to 20 wt. % Au in the total amount of solids, the colored film forming composition may also contain, as necessary, other components including a metal compound such as an organic zirconium compound, organic aluminum compound, organic titanium compound, organic or inorganic manganese compound, organic or inorganic chromium compound, organic or inorganic nickel compound, organic or inorganic copper compound, organic or inorganic zinc compound, organic or inorganic vanadium compound, organic or inorganic indium compound, organic or inorganic bismuth compound, organic or inorganic antimony compound, organic or inorganic tin compound, etc. The above compounds, respectively, cause the colored film to have a zirconium oxide component, an aluminum oxide component, a titanium oxide component, a manganese oxide component, a chromium oxide component, a nickel oxide component, a copper oxide component, a zinc oxide component, a vanadium oxide component, an indium oxide compound, a bismuth oxide component, an antimony oxide component, and a tin oxide component, and these components can be contained as necessary for color tone adjustment. However, if the amount of such components becomes too great, the reflectance of the film will become too great. Small quantities of organic or inorganic boron compound and organic or inorganic phosphorus compound may also be contained. Thus the total content of metal compounds, such as organic zirconium compound, organic aluminum compound, organic titanium compound, organic or inorganic manganese compound, organic or inorganic chromium compound, organic or inorganic nickel compound, organic or inorganic copper compound, organic or inorganic zinc compound, organic or inorganic vanadium compound, organic or inorganic indium compound, organic or inorganic bismuth compound, organic or inorganic antimony compound, organic or inorganic tin compound, organic or inorganic boron compound, organic or inorganic phosphorus compound, etc., expressed as the total weight percentage of the corresponding $ZrO_2$, $Al_2O_3$, $TiO_2$, $MnO_2$, $Cr_2O_3$, $NiO$, $CuO$, $ZnO$, $V_2O_5$, $In_2O_3$, $Bi_2O_3$, $Sb_2O_5$, $SnO_2$, $B_2O_3$, and $P_2O_5$ in the total amount of solids of the colored film forming composition is preferably 0 to 10 wt. %, and more preferably 0 to 8 wt. %.

As the organic zirconium compound to be used as the raw material for zirconium oxide, tetramethoxyzirconium, tetraethoxyzirconium, tetraisopropoxyzirconium, tetra-n-propoxyzirconium, tetraisopropoxyzirconium isopropanol complex, tetraisobutoxyzirconium, tetra-n-butoxyzirconium, tetra-sec-butoxyzirconium, tetra-t-butoxyzirconium, etc., can be used favorably. Zirconium monochloride trialkoxide, zirconium dichloride dialkoxide and other alkoxides of halogenated zirconium compounds, in which the alkoxy group has replaced by a halogen group, can also be used. Chelated zirconium alkoxides, obtained by chelation of the abovementioned zirconium alkoxides with a β-ketoester compound, can also be used favorably. Methyl acetoacetate, ethyl acetoacetate, propyl acetoacetate, butyl acetoacetate and other acetoacetic acid esters having the general formula, $CH_3COCH_2COOR$ (where R is $CH_3$, $C_2H_5$, $C_3H_7$, or $C_4H_9$), can be given as the chelating agent, and among these, alkyl acetoacetates, in particular, methyl acetoacetate and ethyl acetoacetate are favorable as these can be obtained at relatively low cost. Although the zirconium alkoxide may be chelated partially or fully, it is favorable to chelate at a (β-ketoester)/(zirconium alkoxide) molar ratio of 2 since the chelated compound will then be stable. A coating solution cannot be prepared from a zirconium alkoxide that is chelated with acetyl acetone or other chelating agent other than a β-ketoester compound since the chelated compound will then be insoluble and precipitate in alcohol and other solvents. It is also possible to use alkoxyzirconium organic acid salts obtained by replacing at least one alkoxy group of an abovementioned zirconium alkoxide with acetic acid, propionic acid, butanoic acid, acrylic acid, methacrylic acid, stearic acid, or other organic acid.

Aluminum alkoxides, aluminum nitrate, aluminum chloride, and other inorganic aluminum compounds and organic aluminum compounds can be used favorably as the organic aluminum compound used as the raw material for aluminum oxide.

Titanium alkoxides, titanium acetylacetonates, titanium carboxylates, and other organic titanium compounds can be used favorably as the organic titanium compound used as the raw material for titanium oxide. Titanium alkoxides are generally expressed as $Ti(OR)_4$ (where R is an alkyl group with up to four carbons), and in view of the reactivity, titanium isopropoxide and titanium butoxide are preferable. In the case of titanium, it has also been known priorly that the use of acetylacetonates is preferable due to their stability. In this case, the general formula is $Ti(OR)_mL_n$ (m+n=4, n≠0), where L indicates acetyl acetone. Also in this case, a titanium alkoxide may be acetylacetonated using acetyl acetone or a commercially available titanium acetylacetonate may be used. Furthermore, carboxylates may also be used.

The colored film forming composition of the present invention is obtained by dissolving each of the above raw materials in solvent and mixing the solutions at predetermined ratios. The total amount of solvent used is normally 10 to 100 weight parts to 10 weight parts of the total of organometallic compound and chloroauric acid. In the case where a silicon alkoxide is to be used in the present invention, an inorganic acid, such as hydrochloric acid, nitric acid, sulfuric acid, etc., or an organic acid, such as acetic acid, oxalic acid, formic acid, propionic acid, p-toluenesulfonic acid, etc. is used as the hydrolytic catalyst.

The solvent to be used in the present invention depends on the film forming method. For example, an organic solvent of low evaporation rate is preferred as the solvent in the case of the gravure coating method, flexographic printing method, and roll coating method. This is because with a solvent of high evaporation rate, the solvent will evaporate before adequate leveling occurs. The evaporation rate of a solvent is generally expressed by a relative evaporation rate index with that of butyl acetate being 100. A solvent for which the value of this index is 40 or less is classified as a solvent of extremely low evaporation rate and such a solvent is favorable as the organic solvent for the gravure coating method, flexographic printing method, and roll coating method. Such solvents include, for example, ethyl cellosolve, butyl cellosolve, cellosolve acetate, diethylene glycol monoethyl ether, hexylene glycol, diethylene glycol, tripropylene glycol, diacetone alcohol, tetrahydrofurfuryl alcohol, etc. It is preferable that the solvent for the colored film forming composition (coating solution) used in the present invention contains at least one of the above types of solvent, and a plurality of the abovementioned solvents may also be used to adjust the viscosity, surface tension, etc. of the coating solution. Also, a solvent, which is high in evaporation rate and has a relative evaporation rate of over 100, for example, methanol (610), ethanol (340), or n-propanol (300) can be added to the abovementioned solvent with a relative evaporation rate index of 40 or less.

The colored film forming composition of the present invention is coated onto a substrate by a coating method to be described later and thereafter heated under an oxidizing atmosphere at a temperature of 200 to 300° C. for 5 to 200 minutes to cause the gold micro-particles to precipitate and then baked at a temperature of 500 to 800° C. for 10 seconds to 5 minutes to form a thin film of a thickness of 200 nm or less.

A glass substrate can be used favorably as the substrate onto which the colored film forming composition of the present invention is applied, and as the glass substrate, a glass plate of transparent soda lime silicate glass composition as well as green-colored glass, bronze-colored glass, and glass with ultraviolet ray absorptivity can be used. Since the colored film obtained by the present invention does not provide a high ultraviolet ray shielding performance by itself, an automobile glass plate, with a 370 nm wavelength ultraviolet light transmittance (T370 nm) of 10 to 50%, a visible ray transmittance of 70 to 90%, a solar radiation transmittance of 40 to 85%, and a thickness of 1.5 mm to 5.5 mm, is used favorably as the glass substrate. By coating such an ultraviolet ray absorbing glass plate with the colored film forming composition of the present invention, colored glass of higher ultraviolet ray absorptivity can be obtained.

The coating method to be used with the present invention is not limited in particular and the spin coating method, dip coating method, spray coating method, printing method, etc. can be given as examples. Printing methods, such as the gravure coating method, flexographic printing method, roll coating method, screen printing method, etc., are preferable since these are high in productivity and good in the efficient usage of the coating solution components.

The absorption band of surface plasmon absorption, which causes the coloration of the abovementioned gold micro-particles, shifts according to the value of the refractive index of the matrix. The concentration of the compound additive, having the maximum exothermic peak in the range of 170° C. to 250° C., may also be changed to adjust absorption peak and the transmission color tone may be adjusted thereby. Thus colored glass products, in particular, colored film coated glass plates to be used as automobile windows, building windows, etc., that are obtained by the coating and heating of the colored film forming composition of the present invention, preferably have a transmission color tone of chromaticity in the range of a=−4 to 20 and b=−15 to 5, or more preferably, a=−2 to 15 and b=−12 to 3 in Lab color space. It is also preferable for the glass product to have a transmitted light luminosity (L) of 60 to 90.

Since adequate coloration will not be obtained if the thickness of the colored film obtained by coating and heating the colored film forming composition of the present invention is too thin, and the film strength will be low and cracking will tend to occur if the film is too thick, the thickness of the colored film is preferably 30 to 200 nm, or more preferably, 40 to 180 nm, or even more preferably, 50 to 160 nm. The colored film has a refractive index of 1.40 to 1.70.

BEST MODE FOR CARRYING OUT THE INVENTION

The present invention shall now be described in more detail by way of specific embodiments. For optical evaluations of the present invention, optical measurements were made before and after wiping the baked film surface with a wiping cloth to evaluate the surface precipitation conditions of the gold micro-particles and thereby clarify the effects of the invention. In the Tables, Δ Ya indicates the difference (Ya−Y1) between the value of the visible ray transmittance (Ya) after the film surface has been wiped (so as to remove the gold micro-particles that may have precipitated on the surface) and the value of the visible ray transmittance (Y1) prior to wiping the film surface. The smaller the value of Δ Ya, the smaller the amount of gold micro-particles that have precipitated on the surface, and thus the greater the effect of the present invention.

First Embodiment 6 g of 0.1N hydrochloric acid and 44 g of ethyl cellosolve were added to 50 g of ethyl silicate ("Ethyl Silicate 40" made by Colcoat Co., Ltd.) and the mixture was stirred for two hours under room temperature. The resulting solution was identified as silicon oxide stock solution 1. This contains 20% $SiO_2$ solids.

A chloroauric acid stock solution was prepared by dissolving chloroauric acid tetrahydrate to a concentration of 10 wt. % in ethyl cellosolve.

5.9 g of ethyl cellosolve and 0.1 g of trimethylolpropane acrylate ethylene oxide hexaadduct were added to 2.5 g of the silicon oxide stock solution 1 that was prepared in the above manner. 1.5 g of the chloroauric acid stock solution were then added and mixing and stirring were performed to prepare a coating solution 1.

The coating solution 1 prepared in the above manner was then spin coated for 15 seconds at a rotation speed of 1000 rpm onto a transparent glass substrate (non-colored) of 3.4 mm thickness and dimensions of 10 cm×10 cm. After air drying, heat treatment was performed for two hours at 250° C. to precipitate gold micro-particles. The coated glass substrate was then baked for 105 seconds at 720° C. to obtain a colored film coated glass plate. Tables 1 to 3 show the respective characteristics of the colored film coated glass, that is, the refractive index and film thickness of the colored film, the visible ray transmittance (Ya), the difference of visible ray transmittance before and after wiping the film surface (Δ Ya), the transmission color tone, the transmission chromaticity (a, b) and luminosity (L), the visible ray reflectance ("glass surface reflectance") and reflection chromaticity•luminosity ("glass surface reflection chromaticity•luminosity") measured upon projection of light from the glass surface side, and the visible ray reflectance ("film surface reflectance") and reflection chromaticity•luminosity ("film surface reflection chromaticity•luminosity") measured upon projection of light from the film surface side. "E06" indicated in the "Film composition" column of Table 1 indicates the trimethylolpropane acrylate ethylene oxide hexaadduct and the value thereof (1.0 wt. %) indicates the proportion with respect to the total amount of coating solution (including the solvent), and this applies likewise to the second and third embodiments as well as to the twelfth and thirteenth embodiments (Table 7). The trimethylolpropane acrylate ethylene oxide hexaadduct is no longer contained in the baked film. Also in Table 1, the refractive index is that of the film composition excluding the gold micro-particles (same applies to Tables 4 and 7).

The colored film that was obtained showed good results for chemical resistance and wear resistance. Also, as can be seen from the Table, the film exhibited a small Δ Ya of 0.3, which indicates that surface precipitation of gold micro-particles was prevented by the addition of trimethylolpropane acrylate ethylene oxide hexaadduct as the additive. Surface precipitation of gold micro-particles could not be detected by naked eye inspection as well.

Second Embodiment

Besides changing the amounts used of ethyl cellosolve and trimethylolpropane acrylate ethylene oxide hexaadduct, used in preparing coating solution 1 of the first embodiment, to 5.85 g and 0.15 g, respectively, the same procedures as those of the first embodiment were followed to prepare a coating solution 2.

The coating solution that was prepared in the above manner was then spin coated for 10 seconds at a rotation speed of 1000 rpm onto a transparent glass substrate (non-colored) of 3.4 mm thickness and dimensions of 20 cm×40 cm. After air drying, heat treatment was performed for two hours at 250° C. to precipitate gold micro-particles. The coated glass substrate was then kept for 120 seconds in an electric oven set to 720° C. and then drawn out and subject to pressing. Immediately thereafter, the glass plate was tempered by air cooling to obtain a curved tempered glass plate with colored film for automobiles. The curved shape was also obtained as designed and no transparent distortion was observed.

The visible ray transmittance, visible ray reflectance, transmission color tone, and other characteristics of the colored film are shown in Tables 1 through 3. The colored film that was obtained displayed good results for chemical resistance and wear resistance.

Also, as can be seen from the Table, the colored film exhibited a small Δ Ya of 0.13, which indicates that surface precipitation of gold micro-particles was prevented by the addition of trimethylolpropane acrylate ethylene oxide hexaadduct as the additive. Surface precipitation of gold micro-particles could not be detected by naked eye inspection, as well. In comparison to the first embodiment, the transmission color tone of the present embodiment was shifted towards the blue side, and this was considered to be due to a change in the particle size or particle shape of the gold micro-particles.

Third Embodiment

Besides changing the amounts used of ethyl cellosolve and trimethylolpropane acrylate ethylene oxide hexaadduct, used in preparing coating solution 1 of the first embodiment, to 5.80 g and 0.20 g, respectively, the same procedures as those of the first embodiment were followed to prepare a coating solution 3.

The coating solution 3 prepared in the above manner and the same type of substrate as that of the first embodiment were used and treatments were carried out under the same coating conditions and heating/baking conditions as those of the first embodiment to obtain a glass plate with colored film. The optical characteristics measured for the first embodiment were then measured under the same conditions. The results are shown in Tables 1 through 3. The colored film that was obtained displayed good results for chemical resistance and wear resistance. The surface precipitation of gold micro-particles was prevented by the addition of the additive and surface precipitation of gold micro-particles could not be detected by naked eye inspection, etc. In comparison to the first embodiment, the transmission color tone of the present embodiment was shifted towards the blue side, and this was considered to be due to a change in the particle size or particle shape of the gold micro-particles.

Fourth to Sixth Embodiment

<Preparation of Coating Solutions 4 to 6>

2 moles of acetylacetone were added by dripping with a drip funnel to 1 mole of titanium isopropoxide while stirring. The resulting solution was used as the titanium oxide stock solution. This contains $TiO_2$ solids of 16.5%.

1.99 g of silicon oxide stock solution 1 were mixed with 0.25 g of the titanium oxide stock solution and 0.26 g of cerium oxide stock solution, and 5.50 g of ethyl cellosolve were added to the mixture. 2.0 g of chloroauric acid stock solution were then added and mixing and stirring were performed to prepare coating solution 4 (fourth embodiment).

Ethyl cellosolve was added to cerium nitrate hexahydrate so that the amount of $CeO_2$ solids were 23.2% and heating and stirring at 90° C. were performed to obtain a cerium oxide stock solution.

2.15 g of silicon oxide stock solution 1 were mixed with 0.17 g of the titanium oxide stock solution and 0.18 g of the cerium oxide stock solution, and 5.50 g of ethyl cellosolve were added to the mixture. 2.0 g of chloroauric acid stock solution were then added and mixing and stirring were performed to prepare coating solution 5 (fifth embodiment).

2.25 g of silicon oxide stock solution 1 were mixed with 0.12 g of the titanium oxide stock solution and 0.13 g of the cerium oxide stock solution, and 5.50 g of ethyl cellosolve were added to the mixture. 2.0 g of chloroauric acid stock solution were then added and mixing and stirring were performed to prepare coating solution 6 (sixth embodiment).

Each of the coating solutions 4 to 6 prepared in the above manner was then spin coated for 15 seconds at a rotation speed of 1000 rpm onto a transparent glass substrate of 3.4 mm thickness and dimensions of 10 cm×10 cm. After air drying, heat treatment was performed on each coated glass substrate for two hours at 250° C. to precipitate gold micro-particles. The respective coated glass substrates were furthermore baked for 120 seconds at 720° C. to obtain three types of colored film coated glass plates. The colored film coated glass plates obtained using coating solutions 4, 5, and 6 were identified as the fourth, fifth, and sixth embodiments, respectively. The visible ray transmittance, visible ray reflectance, transmission color tone, and other characteristics of the respective colored film coated glass plates are shown in Tables 1 through 3. The colored films that were obtained displayed good results for chemical resistance and wear resistance. Also in all embodiments, surface precipitation of gold micro-particles was prevented by the addition of cerium nitrate as the additive and surface precipitation of gold micro-particles could not be detected by naked eye inspection, etc. It was also shown that the $CeO_2$ equivalent amounts of cerium oxide shown in Table 1 remained in the films as a result of adding cerium nitrate.

Seventh Embodiment 100 g of iron chloride hexahydrate were dissolved in 195.7 g of ethyl cellosolve to prepare a 10 wt. % iron oxide stock solution.

2.38 g of silicon oxide stock solution 1 were mixed with 0.23 g of the iron oxide stock solution, and 5.39 g of ethyl cellosolve were added to the mixture. 2.0 g of chloroauric acid stock solution were then added and mixing and stirring were performed to prepare coating solution 7.

The coating solution 7 prepared above was then spin coated for 15 seconds at a rotation speed of 1000 rpm onto a transparent glass substrate of 3.4 mm thickness and dimensions of 10 cm×10 cm. After air drying, heat treatment was performed on the coated glass substrate for two hours at 250° C. to precipitate gold micro-particles. The coated glass substrate was furthermore baked for 120 seconds at 720° C. to obtain a glass plate with colored film. The visible ray transmittance, visible ray reflectance, transmission color tone, and other characteristics of the colored film are shown in Tables 1 through 3. The colored film obtained displayed good results for chemical resistance and wear resistance. Also, surface precipitation of gold micro-particles was prevented by the addition of iron chloride hexahydrate as the additive and surface precipitation of gold micro-particles could not be detected by naked eye inspection, etc. As with the eighth and ninth embodiments, it was also shown that the $Fe_2O_3$ equivalent amount of iron oxide shown in Table 1 remained in the film as a result of adding iron chloride.

Eighth Embodiment 2.43 g of silicon oxide stock solution 1 were mixed with 0.13 g of the iron oxide stock solution, and 5.44 g of ethyl cellosolve were added to the mixture. 2.0 g of chloroauric acid stock solution were then added and mixing and stirring were performed to prepare coating solution 8.

The coating solution 8 that was prepared in the above manner and the same type of substrate as that of the seventh embodiment were used and treatments were carried out under the same coating conditions and heating/baking conditions as those of the seventh embodiment to obtain a glass plate with colored film. The visible ray transmittance, visible ray reflectance, transmission color tone, and other characteristics of the colored film are shown in Tables 1 through 3. The colored film obtained displayed good results for chemical resistance and wear resistance. The surface precipitation of gold micro-particles was prevented by the addition of iron chloride hexahydrate as the additive and surface precipitation of gold micro-particles could not be detected by naked eye inspection, etc.

Ninth Embodiment

Coating solution 8, used in the eighth embodiment, was spin coated for 10 seconds at a rotation speed of 1000 rpm onto a UV-cutoff green glass substrate (visible transmittance Ya=73.1%, solar radiation transmittance Tg=48.9%, visible light reflectance rg=6.6%, transmission color tone: green with transmitted light chromaticity of a=−7.1, b=2.8, L=86 and reflected light chromaticity of a=−1.7, b=−0.1 as chromaticity in Lab space) of 3.4 mm thickness and dimensions of 10 cm×10 cm. After air drying, heat treatment was performed on the coated glass substrate for two hours at 250° C. to precipitate gold micro-particles. The coated glass substrate was, furthermore, baked for 120 seconds at 720° C. to obtain a glass plate with a colored film. The visible ray transmittance, visible ray reflectance, transmission color tone, and other characteristics of the colored film are shown in Tables 1 through 3. The colored film obtained displayed good results for chemical resistance and wear resistance. The surface precipitation of gold micro-particles was prevented by the addition of iron chloride hexahydrate as the additive and surface precipitation of gold micro-particles could not be detected by naked eye inspection, etc.

TABLE 2-continued

| Embodiment No. | Ya (%) | ΔYa | Transmission color tone | Transmission chromaticity luminosity (a/b/L) | Glass surface reflectance (%) |
| --- | --- | --- | --- | --- | --- |
| 7 | 74.1 | 0.3 | pink | 8.9/−4.3/85.4 | 8.8 |
| 8 | 74.0 | 0.3 | pink | 9.3/−4.0/85.2 | 8.6 |
| 9 | 64.3 | 0.2 | neutral gray | 0.1/0.5/80.2 | 6.7 |

TABLE 3

| Embodiment No. | Glass surface reflection chromaticity luminosity (a/b/L) | Film surface reflectance (%) | Film surface reflection chromaticity luminosity (a/b/L) |
| --- | --- | --- | --- |
| 1 | 0.2/0.3/28.2 | 6.88 | 3.7/−0.7/25.8 |
| 2 | −0.4/0.5/28.4 | 5.95 | 5.5/−2.6/23.9 |
| 3 | −0.5/0.5/28.2 | 5.49 | 4.9/−4.2/23.2 |
| 4 | 3.6/1.5/30.7 | 10.4 | 2.5/3.4/31.8 |
| 5 | 3.1/1.2/29.4 | 9.39 | 2.6/2.6/30.1 |
| 6 | 3.7/1.6/28.6 | 9.23 | 2.3/3.3/29.8 |
| 7 | 1.5/1.5/29.3 | 7.9 | 4.7/1.8/27.3 |
| 8 | 1.7/1.3/29.0 | 7.8 | 4.4/1.5/27.3 |
| 9 | −0.8/1.0/26.0 | 6.2 | 1.9/1.7/24.6 |

First Comparison Example 5.5 g of ethyl cellosolve were added to 2.5 g of silicon oxide stock solution 1 used in the first embodiment. 2 g of chloroauric acid stock solution were then added and mixing and stirring were performed to prepare a coating solution 9.

TABLE 1

| | Film composition (Wt %) | | | Amount of additive | | | | |
| --- | --- | --- | --- | --- | --- | --- | --- | --- |
| Embodiment | Matrix | | | (cerium nitrate) | (iron chloride) | | Refractive | Film |
| No. | $SiO_2$ | $TiO_2$ | Au | $CeO_2$ | $Fe_2O_3$ | EO6 | index | thickness |
| 1 | 87.5 | 0.0 | 12.5 | — | — | 1.0 wt % | 1.46 | 125 nm |
| 2 | 87.5 | 0.0 | 12.5 | — | — | 1.5 wt % | 1.46 | 125 nm |
| 3 | 87.5 | 0.0 | 12.5 | — | — | 2.0 wt % | 1.46 | 127 nm |
| 4 | 67.0 | 6.85 | 16.0 | 10.2 | — | — | 1.54 | 110 nm |
| 5 | 72.1 | 4.79 | 16.0 | 7.1 | — | — | 1.51 | 105 nm |
| 6 | 75.7 | 3.35 | 16.0 | 5.0 | — | — | 1.50 | 108 nm |
| 7 | 80.1 | 0.0 | 16.1 | — | 3.9 | — | 1.49 | 85 nm |
| 8 | 81.7 | 0.0 | 16.1 | — | 2.2 | — | 1.47 | 90 nm |
| 9 | 81.7 | 0.0 | 16.1 | — | 2.2 | — | 1.47 | 87 nm |

TABLE 2

| Embodiment No. | Ya (%) | ΔYa | Transmission color tone | Transmission chromaticity luminosity (a/b/L) | Glass surface reflectance (%) |
| --- | --- | --- | --- | --- | --- |
| 1 | 79.9 | 0.3 | wine red | 6.4/−1.6/88.8 | 7.98 |
| 2 | 78.0 | 0.13 | pink | 7.4/−3.3/87.7 | 8.08 |
| 3 | 76.9 | 0.24 | pink | 6.3/−4.1/87.3 | 7.96 |
| 4 | 74.2 | −0.02 | pink | 6.1/−4.6/85.8 | 10.44 |
| 5 | 77.4 | 0.03 | pink | 5.7/−3.9/87.6 | 9.39 |
| 6 | 76.7 | 0.06 | pink | 6.9/−4.7/87.1 | 9.23 |

Coating, drying, and baking were then performed in the same manner as the first embodiment to obtain a colored film coated glass. The visible ray transmittance, visible ray reflectance, transmission color tone, and other characteristics of the colored film coated glass are shown in Tables 4 through 6. In Table 4, the refractive index is that of the film composition excluding the gold micro-particles. In comparison to systems in which additive, etc. of the embodiments of the present invention were added, the colored film obtained in the present example exhibited a large Δ Ya of 1.41, clearly indicating that the surface precipitation of gold micro-particles had increased. Gold micro-particles that had floated to the film surface could also be identified by naked eye observation.

Second Comparison Example

Besides using 1-ethoxy-2-propanol in place of the ethyl cellosolve, which was used as the solvent in the first comparison example, the same procedures as those of the first comparison example were carried out. In comparison to systems in which additive, etc. of the embodiments of the present invention were added, the surface precipitation of gold micro-particles had clearly increased and gold micro-particles that had floated to the film surface could also be identified by naked eye observation.

Third Comparison Example

Besides using methyl cellosolve acetate in place of the ethyl cellosolve, which was used as the solvent in the first comparison example, the same procedures as those of the first comparison example were carried out. In comparison to systems in which additive, etc. of the embodiments of the present invention were added, the surface precipitation of gold micro-particles had clearly increased and gold micro-particles that had floated to the film surface could also be identified by naked eye observation.

TABLE 4

| Comparison example No. | Film composition (wt. %) | | Refractive index | Film thickness |
| --- | --- | --- | --- | --- |
| | $SiO_2$ | Au | | |
| 1 | 84 | 16 | 1.46 | 115 nm |
| 2 | 84 | 16 | 1.46 | 130 nm |
| 3 | 84 | 16 | 1.46 | 120 nm |

TABLE 5

| Comparison example No. | Ya (%) | ΔYa | Transmission color tone | Transmission chromaticity luminosity (a/b/L) | Glass surface reflectance (%) |
| --- | --- | --- | --- | --- | --- |
| 1 | 76.2 | 1.41 | pink | 8.2/−2.5/86.5 | 7.3 |
| 2 | 75.2 | 0.93 | pink | 8.9/−2.3/85.9 | 7.5 |
| 3 | 77.1 | 1.13 | pink | 7.0/−1.9/87.5 | 7.8 |

TABLE 6

| Comparison example No. | Glass surface reflection chromaticity luminosity (a/b/L) | Film surface reflectance (%) | Film surface reflection chromaticity luminosity (a/b/L) |
| --- | --- | --- | --- |
| 1 | 1.2/0.9/26.9 | 6.8 | 2.7/0.1/26.8 |
| 2 | 1.5/1.2/27.3 | 6.9 | 2.5/0.5/25.9 |
| 3 | 1.0/1.3/28.5 | 7.2 | 2.2/0.8/26.5 |

Tenth and Eleventh Embodiments

<Preparation of Coating Solutions 10 and 11>

10 g of cobalt chloride hexahydrate were dissolved in 40 g of ethyl cellosolve to prepare a cobalt oxide stock solution.

4.5 g of 1N hydrochloric acid and 20.5 g of ethyl cellosolve were added to 25 g of ethyl silicate, and the mixture was stirred for two hours under room temperature. 5.85 g of methyltriethoxysilane, 5.14 g of ethyl cellosolve, and 0.70 g of 0.1N hydrochloric acid were then added to the above solution and the mixture was stirred for two hours. The resulting solution was identified as silicon oxide solution 2. This contains $SiO_2$ solids of 19.4%.

3.5 g of cobalt oxide stock solution and 12.1 g of ethyl cellosolve were added to 15.8 g of silicon oxide stock solution 2 prepared in the above manner. 10 g of the chloroauric acid stock solution were then added and mixing and stirring were performed to prepare a coating solution 10 (tenth embodiment).

3.0 g of cobalt oxide stock solution and 11.5 g of ethyl cellosolve were added to 15.5 g of silicon oxide stock solution 2 prepared in the above manner. 10 g of the chloroauric acid stock solution were then added and mixing and stirring were performed to prepare a coating solution 11 (eleventh embodiment).

<Coating, Heating, and Measurement>

Each of the coating solutions 10 and 11 prepared in the above manner was coated onto a transparent glass substrate of 3.4 mm thickness and dimensions of 10 cm×10 cm using a gravure coating device. After air drying, heat treatment was performed on each coated glass substrate for two hours at 250° C. to precipitate gold micro-particles. The respective coated glass substrates were, furthermore, baked for 130 seconds at 720° C. to obtain glass plates with colored film. The colored film coated glass plates obtained using coating solutions 10 and 11 were identified as the tenth and eleventh embodiments, respectively. The visible ray transmittance, visible ray reflectance, transmission color tone, and other characteristics of the respective colored film coated glass plates are shown in Tables 7 through 9. With both the tenth and eleventh embodiments, the colored films that were obtained displayed good results for chemical resistance and wear resistance. Also, surface precipitation of gold micro-particles was prevented by the addition of cobalt chloride hexahydrate as the additive and surface precipitation of gold micro-particles could not be detected by naked eye inspection, etc. The addition of the cobalt chloride hexahydrate enabled a bluish tint to be added to the color tone. It was also shown that the CoO equivalent amounts of cobalt oxide shown in Table 7 remained in the films as a result of adding cobalt chloride.

Twelfth and Thirteenth Embodiments

A transparent glass substrate of 2.1 mm thickness and dimensions of 10 cm×10 cm was prepared.

<Preparation of Coating Solutions 12 and 13>

Coating solution 1 used in the first embodiment was used as coating solution 12 (twelfth embodiment).

Diacetone alcohol and 0.1 g of trimethylolpropane acrylate ethylene oxide hexaadduct were added to 2.58 g of silicon oxide stock solution 2 prepared in the tenth embodiment. 1.5 g of the chloroauric acid stock solution were then added and mixing and stirring were performed to prepare a coating solution 13 (thirteenth embodiment).

<Coating, Heating, Processing, and Measurement>

Each of the coating solutions 12 and 13 prepared in the above manner was then spin coated separately for 15 seconds at a rotation speed of 1500 rpm onto the transparent glass substrate described above. After air drying, heat treatment was performed on each coated glass substrate for two hours at 250° C. to precipitate gold micro-particles. These coated glass substrates were placed in a heating oven and raised in temperature to 610° C. within two hours, kept at said temperature for ten minutes, and then cooled naturally to obtain two types of glass plates with colored film. A polyvinyl butyral intermediate film of 0.8 mm thickness was then sandwiched between the abovementioned transparent glass plate and each of the colored film glass plates with the colored film at the inner side, and heating and pressurization were performed for 15 minutes at 250° C. in an autoclave to obtain two types of laminated glass having colored film in the middle. The colored film coated laminated glass plates obtained using coating solutions 12 and 13 were identified as the twelfth and thirteenth embodiments, respectively. The visible ray transmittance, visible ray reflectance, transmission color tone, and other characteristics of the respective colored film coated laminated glass plates are shown in Tables 7 through 9. With both the twelfth and thirteenth embodiments, the colored films obtained displayed good results for chemical resistance and wear resistance. In the reflectance and reflection chromaticity columns for "Glass surface" in Tables 8 and 9 are shown measured values for light reflected from the entire surface when light is made incident from the external glass surface side of the colored film coated glass plate between the two surfaces of the laminated glass, and in the reflectance and reflection chromaticity columns for "Film surface" in Tables 8 and 9 are shown measured values for light reflected from the entire surface when light is made incident from the other surface side of the laminated glass plate, in other words, from the external glass surface side of the glass plate without the colored film.

TABLE 7

| Embodiment No. | Film composition (Wt %) | | Amount of additive | | Refractive index | Film thickness (nm) |
|---|---|---|---|---|---|---|
| | Matrix | | (cobalt chloride) | EO6 | | |
| | $SiO_2$ | Au | CoO | | | |
| 10 | 83.6 | 12.9 | 3.5 | — | 1.48 | 120 |
| 11 | 81.9 | 12.9 | 5.1 | — | 1.49 | 120 |
| 12 | 87.5 | 12.5 | — | 0.1 wt % | 1.46 | 100 |
| 13 | 87.5 | 12.5 | — | 0.1 wt % | 1.46 | 110 |

TABLE 8

| Embodiment No. | Ya (%) | ΔYa | Transmission color tone | Transmission chromaticity luminosity (a/b/L) | Glass surface reflectance (%) |
|---|---|---|---|---|---|
| 10 | 68.4 | 0.1 | reddish | 7.6/−7.6–82.4 | 8.7 |
| 11 | 67.0 | 0.05 | purple | 8.2/−8.4/81.5 | 9.0 |
| 12 | 76.9 | 0.01 | reddish | 4.5/−1.5/87.9 | 7.8 |
| 13 | 74.2 | −0.03 | purple wine red wine red | 3.8/−0.8/88.5 | 7.5 |

TABLE 9

| Embodiment No. | Glass surface reflection chromaticity luminosity (a/b/L) | Film surface reflectance (%) | Film surface reflection chromaticity luminosity (a/b/L) |
|---|---|---|---|
| 10 | 3.5/1.3/26.2 | 8.6 | 3.7/1.4/25.8 |
| 11 | 4.1/1.3/25.4 | 7.6 | 7.5/1.0/23.9 |
| 12 | 0.8/0.6/28.2 | 7.9 | 0.9/0.3/28.2 |
| 13 | 0.7/0.5/30.7 | 7.5 | 1.2/0.5/31.8 |

Effects of the Invention

As has been described above, by the present invention, a minute amount of organic or inorganic additive, having the maximum exothermic peak in the range of 170° C. to 250° C., is added to a colored film forming composition for glass products to enable the generation of gold micro-particles to be controlled and the precipitation of gold micro-particles on the colored film surface to be prevented. Furthermore, subtle color tone adjustments are enabled through adjustment of the amount of additive added.

The colored film forming composition of the present invention can thus be used for coating the surface of glass products, especially, windows, mirrors, etc. of automobiles and other vehicles and buildings.

What is claimed is:

1. A colored film forming composition containing at least an organic silicon compound that can undergo hydrolysis and polycondensation and at least a chloroauric acid, said colored film forming composition being characterized in there being added at least one compound exhibiting the maximum exothermic peak in the range of 170° C. to 250° C., in differential thermal analysis.

2. A colored film forming composition as set forth in claim 1, wherein the added compound is an organic compound having an ether bond and a carbon-carbon double bond within the molecule.

3. A colored film forming composition as set forth in claim 2, wherein the added compound comprises 0.5 to 5 wt. % of the total amount of the colored film forming composition.

4. A colored film forming composition as set forth in claim 2 or 3, wherein the added compound is a trimethylolpropane triacrylate having six ethylene oxide units within the molecule.

5. A colored film forming composition as set forth in claim 1, wherein the added compound is at least one inorganic compound selected from among a group comprised of cerium nitrate, cobalt chloride, iron nitrate, and iron chloride.

6. A colored film forming composition as set forth in claim 5, wherein the added compound comprises 0.3 to 20 wt. % of the total amount of solids of the colored film forming composition.

7. A method of manufacturing colored film coated glass products, characterized in that a colored film forming composition, containing at least a silicon containing composition for a sol-gel method and at least a chloroauric acid, is coated onto a glass substrate and then heated and baked, said method of manufacturing colored film coated glass products being characterized in that at least one compound exhibiting the maximum exothermic peak in the range of 170° C. to 250° C., in differential thermal analysis is added to the colored film forming composition.

* * * * *